US012715744B2

(12) United States Patent
Mattoli

(10) Patent No.: US 12,715,744 B2
(45) Date of Patent: Aug. 25, 2026

(54) DEPLOYABLE AND FULLY FOLDABLE DAVIT CRANE

(71) Applicant: Alessio Mattoli, Miami, FL (US)

(72) Inventor: Alessio Mattoli, Miami, FL (US)

( * ) Notice: Subject to any disclaimer, the term of this patent is extended or adjusted under 35 U.S.C. 154(b) by 298 days.

(21) Appl. No.: 18/206,914

(22) Filed: Jun. 7, 2023

(65) Prior Publication Data

US 2024/0025711 A1 Jan. 25, 2024

Related U.S. Application Data

(60) Provisional application No. 63/349,983, filed on Jun. 7, 2022.

(51) Int. Cl.
*B66C 23/68* (2006.01)

(52) U.S. Cl.
CPC .................................... *B66C 23/68* (2013.01)

(58) Field of Classification Search
CPC ......... B66C 23/42; B66C 23/44; B66C 23/68; B66C 23/202; B66C 23/18; B66C 23/36; B66C 13/12; B66C 13/085; B66C 23/54; B66C 2700/0357; B66C 2700/0364; B60P 1/5495
See application file for complete search history.

(56) References Cited

U.S. PATENT DOCUMENTS 3,121,499 A * 2/1964 Barre, Jr. ................ B66F 11/04 182/148
3,285,445 A * 11/1966 Broziat ................... B66C 23/84 212/292
4,406,574 A * 9/1983 Riley ...................... B66C 23/44 212/300
4,419,038 A * 12/1983 Pendergraft .......... B60P 1/5495 212/347
5,725,112 A * 3/1998 Thorby ................... B66C 23/44 212/238
6,007,289 A * 12/1999 Kruse .................. A61G 3/0209 414/921
6,460,908 B1 * 10/2002 Green ..................... B60R 19/48 424/543
6,578,722 B2 * 6/2003 Perkins ................... B66C 23/44 212/294
6,688,836 B2 * 2/2004 Gourand ................. B66C 23/44 414/541
6,705,821 B2 * 3/2004 Philipps ................ B60P 1/5471 414/462

(Continued)

FOREIGN PATENT DOCUMENTS

DE 202005017344 U1 * 2/2006 ........... B66C 23/706
KR 101950223 B1 * 2/2019 ............. B66C 23/78

*Primary Examiner* — Navid Z. Mehdizadeh
*Assistant Examiner* — Henrix Soto
(74) *Attorney, Agent, or Firm* — The Rapacke Law Group, P.A.

(57) ABSTRACT

A folding structural frame may include a base and a first structural member coupled to the base at a bottom end and extending in a substantially vertical direction when in an operable configuration. A second structural member is coupled to a top end of the first structural member and extending in a substantially horizontal direction when in an operable configuration. An elongated member extends through the second structural member and operable to be removably coupled with an item to be moved by the folding structural frame.

15 Claims, 7 Drawing Sheets

(56) References Cited

U.S. PATENT DOCUMENTS

| | | | | |
|---|---|---|---|---|
| 6,821,075 | B2 * | 11/2004 | van der Horn | B66C 23/44 414/543 |
| 7,070,059 | B1 * | 7/2006 | Flowers | B66C 23/44 414/921 |
| 7,156,246 | B2 * | 1/2007 | Sherrod | B66C 23/44 414/462 |
| 7,448,944 | B1 * | 11/2008 | Baumler | A22B 7/001 452/187 |
| 8,844,738 | B2 * | 9/2014 | Thompson | B66C 23/48 212/294 |
| 2004/0197181 | A1 * | 10/2004 | Clark | B66C 23/005 414/729 |
| 2008/0197095 | A1 * | 8/2008 | Spitsbergen | B66C 23/68 212/300 |
| 2009/0152227 | A1 * | 6/2009 | Thompson | B66C 23/44 212/347 |
| 2016/0009532 | A1 * | 1/2016 | Bennette | B27L 7/00 144/250.25 |
| 2021/0268952 | A1 * | 9/2021 | Leonard | F16H 1/16 |

* cited by examiner

DEPLOYABLE AND FULLY FOLDABLE DAVIT CRANE

CROSS-REFERENCE TO RELATED APPLICATIONS

The present application claims priority to U.S. Provisional Application No. 63/349,983 filed Jun. 7, 2022, titled "DEPLOYABLE AND FULLY FOLDABLE DAVIT CRANE" which is hereby incorporated by reference in its entirety.

TECHNICAL FIELD

The embodiments disclosed herein generally relate to load bearing structural frames that are fully expandable and can be collapsed and stowed in a much smaller, ergonomic form.

BACKGROUND

Load bearing structural frames have been used in many forms to move items, especially those that are cumbersome and awkwardly shaped. These types of structural frames are often used in construction, shipping, transportation, and other industries.

Many combinations of materials have been used to construct such frames, including wood, plastics, composites, metals, concrete, and more. These each have benefits and drawbacks and define, in part, the type and limits of the frame's operability. Since nearly all of these structural frame apparatuses are designed with a permanent, static end-state in mind, they can suffer from a lack of convenience and adaptability.

While large structural frames may have parts fixed in a permanent orientation, smaller frames have been more adaptable. Nevertheless, humans have often needed to intervene in order to manually lift a structural frame's boom and secure it in place with respect to a mast of the structural frame using pins or other securing elements. As with moving and adjusting the position of many objects, a certain element of inherent physical risk is introduced when a human must physically move or adjust something by hand.

Thus, it would be beneficial and needs exist for collapsible and storable structural frames, which can be automated in some embodiments.

SUMMARY OF THE INVENTION

This summary is provided to introduce a variety of concepts in a simplified form that is further disclosed in the detailed description of the embodiments. This summary is not intended for determining the scope of the claimed subject matter.

The embodiments provided herein relate to a folding structural frame, including, a base and a first structural member coupled to the base at a bottom end and extending in a substantially vertical direction when in an operable configuration. A second structural member is coupled to a top end of the first structural member and extending in a substantially horizontal direction when in an operable configuration. An elongated member extends through the second structural member and operable to be removably coupled with an item to be moved by the folding structural frame.

In general, users can use the frame as a load-bearing structural frame when fully expanded that can be collapsed and stowed away quickly as a much smaller ergonomic mobile device. In various embodiments, these structural frames include one or more of a base, mast, boom, winch, line, controller, and/or storage compartment.

Structural frames, also referred to as davit cranes herein, need only be deployed at specific times and can be dangerous even when not in operation. Herein, the dangers of both operation and nonoperation are mitigating by providing electrically powered and storable structural frames. As such, manual intervention requirements are minimized or eliminated. Human effort, trapping danger during assembly, and use of securing pins are negated or minimized. Heavy loads are able to be moved in a three hundred and sixty degree area about the mast. Once complete, the structure can be folded using electrical and/or hydraulic mechanisms.

When in a storage configuration the mast and boom can fold into a generally horizontal orientation and configuration that allow them to be stored out of sight, such as in a boat, truck, or specialized enclosure.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1A:
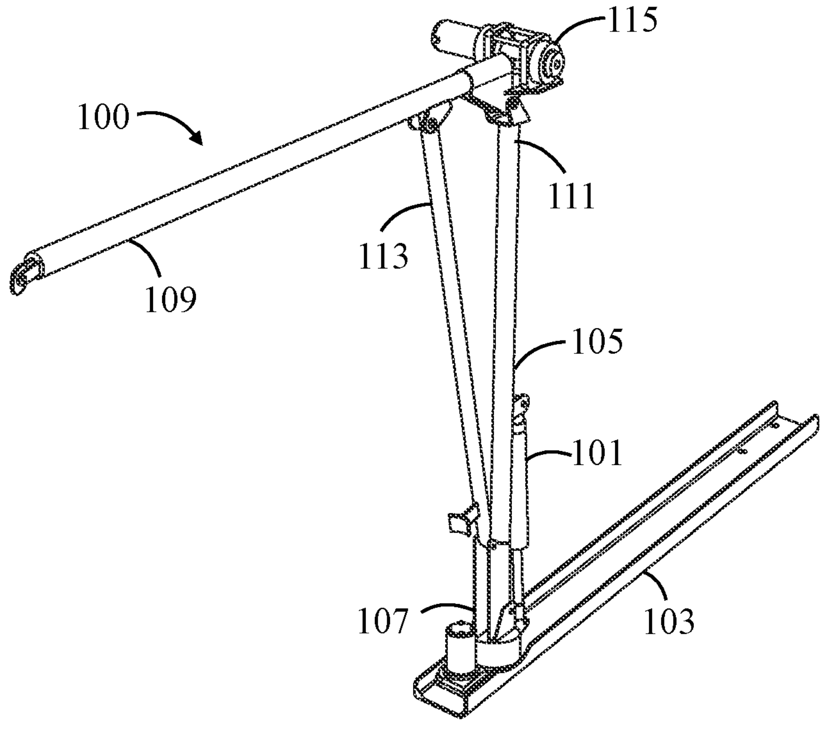
FIGS. 1A-1B illustrates a folding structural frame in expanded configuration from front perspective views, according to some embodiments.

Before describing example embodiments in detail, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The embodiments herein include a folding structural frame with an arm or boom that can be articulated or otherwise moved into a desired position using an electrically powered assembly. The assembly can by a hydraulic, mechanical, or other powered system that allows the arm or boom to move from a folded, storage position to a use position. One or more control buttons can allow an operator or user to change the configuration of the folding structural frame at their desired time, based on user input or activation of one or more buttons.

In some embodiments the folding structural frame includes a metal base. Such base can be mounted on or coupled with one or more bearings that allows the folding structural frame to rotate between zero and three-hundred-sixty degrees. On the rotating base there can be an attachment that allows a mast of the folding structural frame to be held in a secured position when deployed and to pivot. The arm or boom is generally located and coupled with, at, or near the top of the mast. A ram lifter or hydraulic jack can be included at the base of the mast in order to deploy and fold the folding structural frame using a single, fluid motion.

The boom can include a winch near a proximal end of the arm or boom, where the proximal end of the arm or boom is coupled with, at, or near the top of the mast. The boom winch can be used in conjunction with a rope, cord, or other elongated member that is deployable through a hollow interior or channel of the arm or boom. A distal end of the arm or boom can include a permanently or removably coupled pulley, which can be a block pulley. This pulley is operable to diver the rope toward a desired position and maintain its orientation and position with respect to the boom. When in a folded configuration, both the boom and mast include supports that hold the folding structural frame in a secure and tight position.

The mast can be secured via one or more screwing mechanisms and/or tabs in a deployed configuration. These tabs may have a five hundred pound capacity in some embodiments.

Electronics can be housed in a control box of the vehicle the structural frame is coupled to or otherwise coupled with the frame. In some embodiments, remote control options are contemplated.

Power can be provided via a battery (e.g., 12V, 24V, hydraulic powerpack) or gas engine or the like. Backup power is also contemplated.

In some embodiments, three motors are generally employed; a winch motor, rotation motor, and lift motor.

Figure 1B:
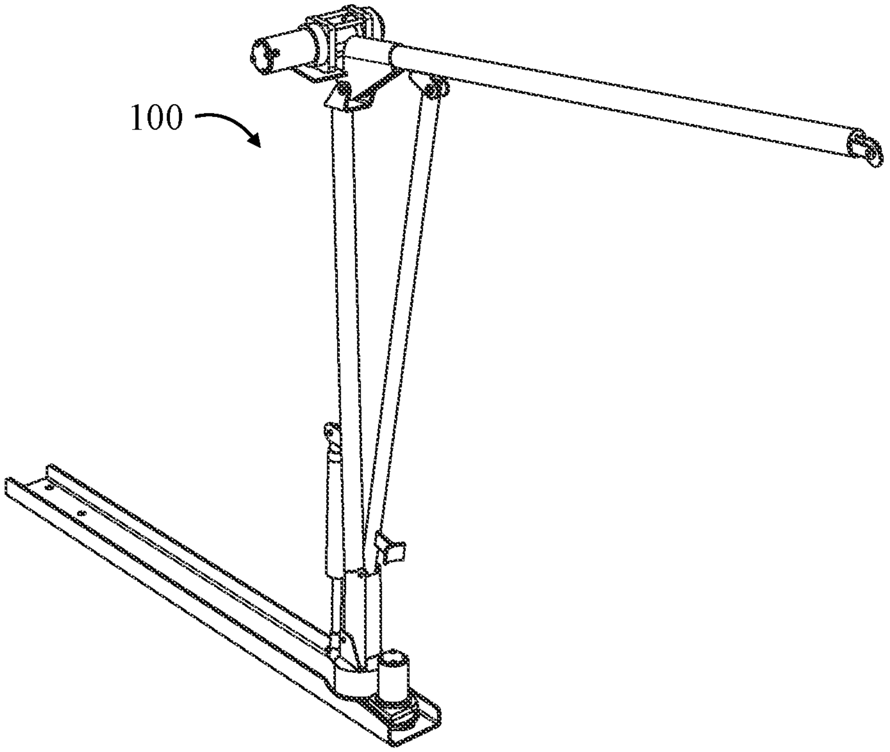

FIGS. 1A-1B illustrates a folding structural frame 100 in expanded configuration 101 from front perspective views. The folding structural frame 100 includes a base 103 and a first structural member 105 coupled to the base at a bottom end 107. The first structural member 105 extends in a substantially vertical direction when in the expanded configuration (i.e., an operable configuration. A second structural member 109 is coupled to a top end 111 of the first structural member 105 and extends in a substantially horizontal direction when in the operable configuration. An elongated member 113 extends through the second structural member 109 and is operable to be removably coupled with an item to be moved by the folding structural frame 100.

In some embodiments, FIG. 1A illustrates a motor 115 which is provided within a housing. The motor is controlled via a control module which may include one or more buttons to operate the various features of the device. This allows a user to operate the device, move each element of the device, connect various components of the device, and manipulate an item carried by the device.

Figure 2:
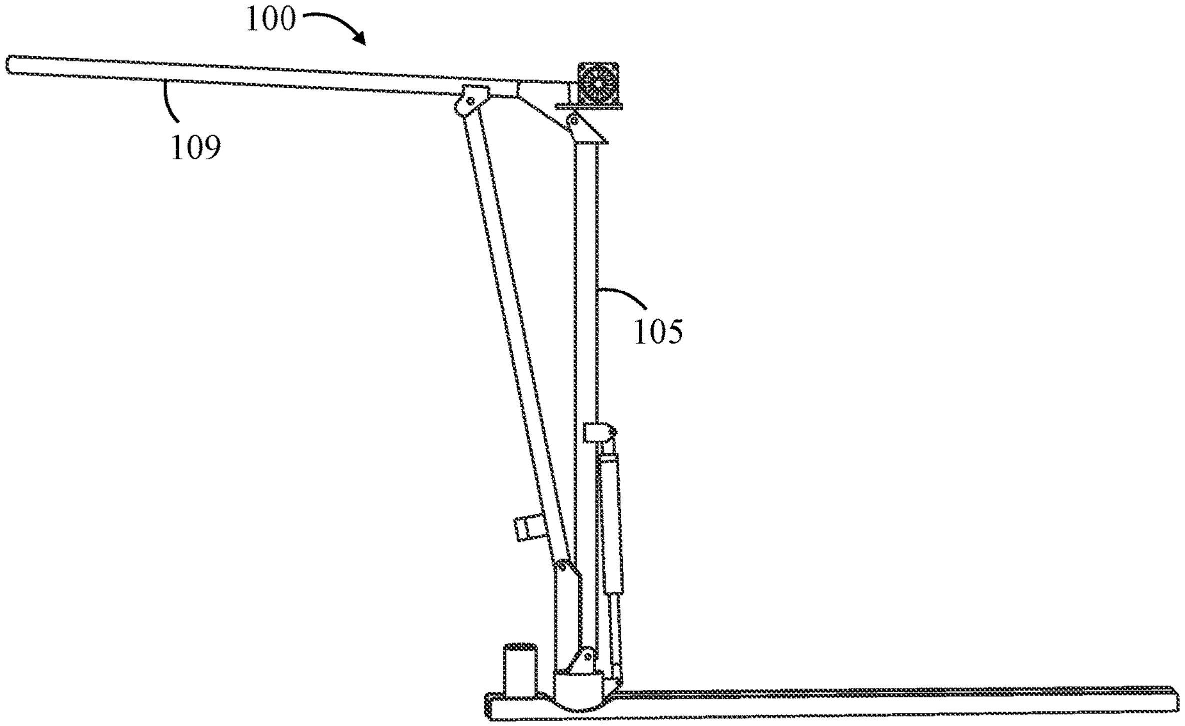
FIG. 2 illustrates a folding structural frame in expanded configuration from a side view, according to some embodiments.

FIG. 2 illustrates a folding structural frame 100 in expanded configuration from a side view. The folding structural frame 100 includes at least one actuator to move the first structural member 105 and/or the second structural member 109 to move each element during use (e.g., when lifting or moving an item).

Figure 3A:
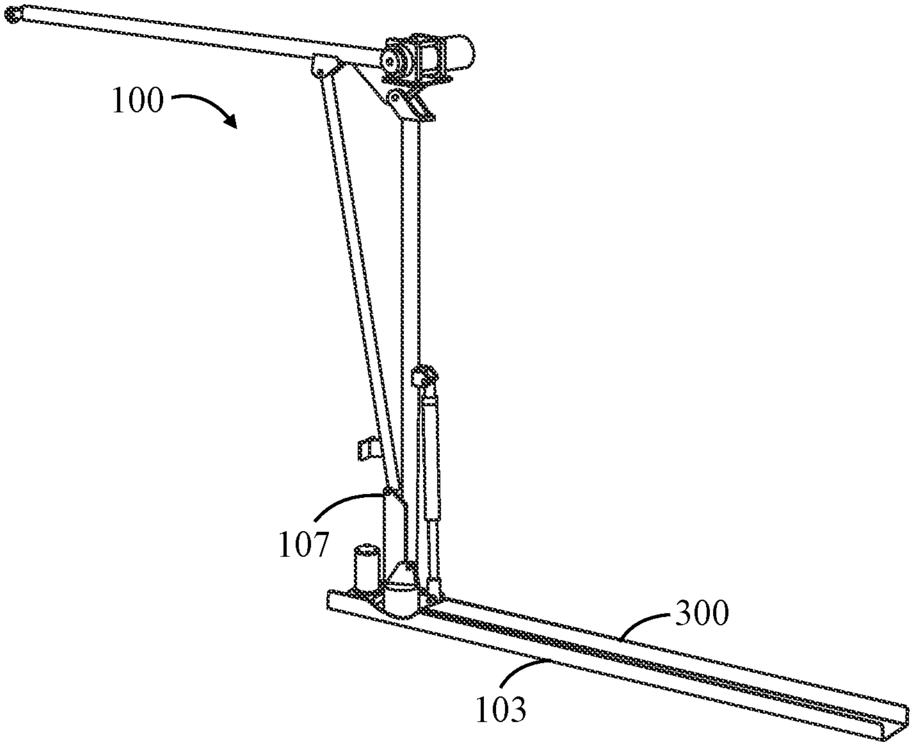
FIGS. 3A-3B illustrate a folding structural frame in expanded configuration with from rear perspective views, according to some embodiments.
Figure 3B:
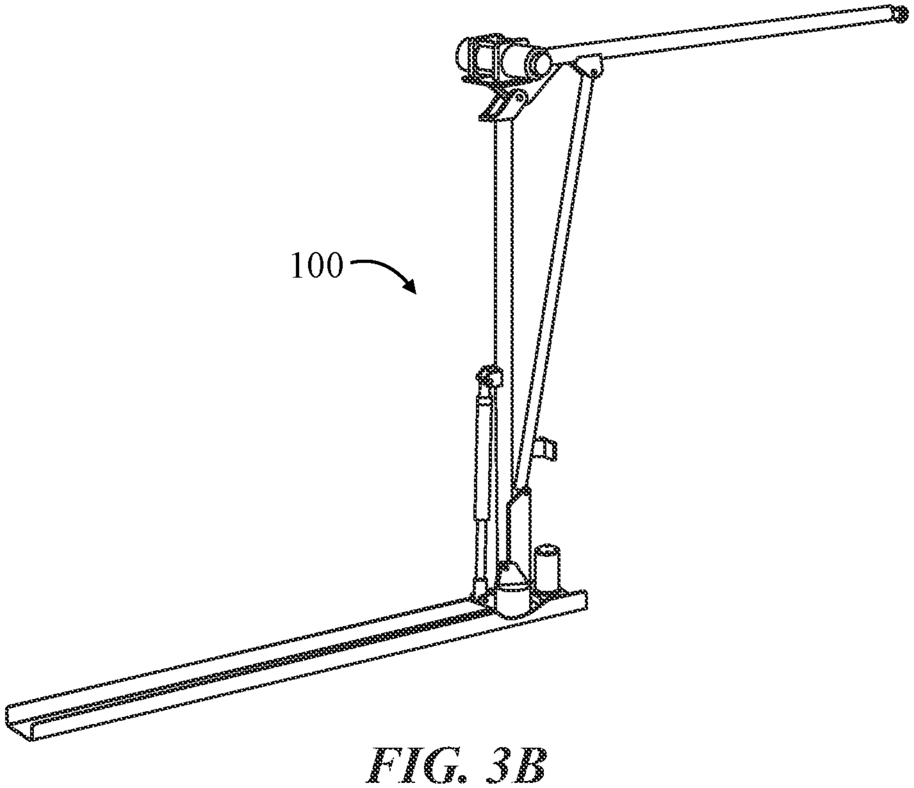
Figure 4A:
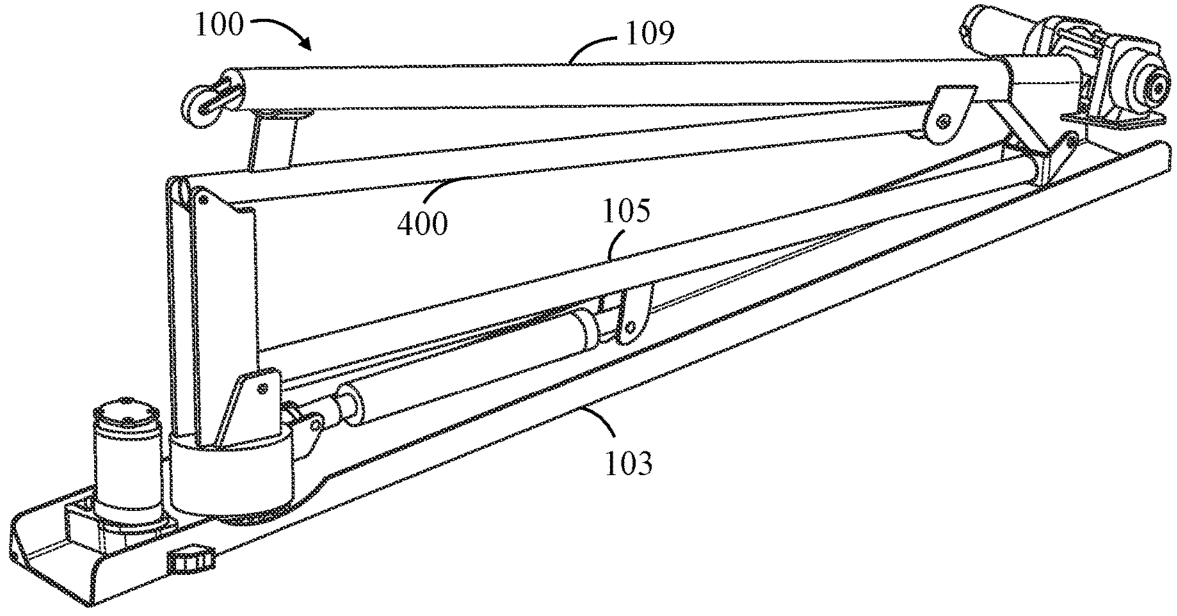
FIGS. 4A-4B illustrate a folding structural frame in folded configuration from a front perspective, according to some embodiments.
Figure 4B:
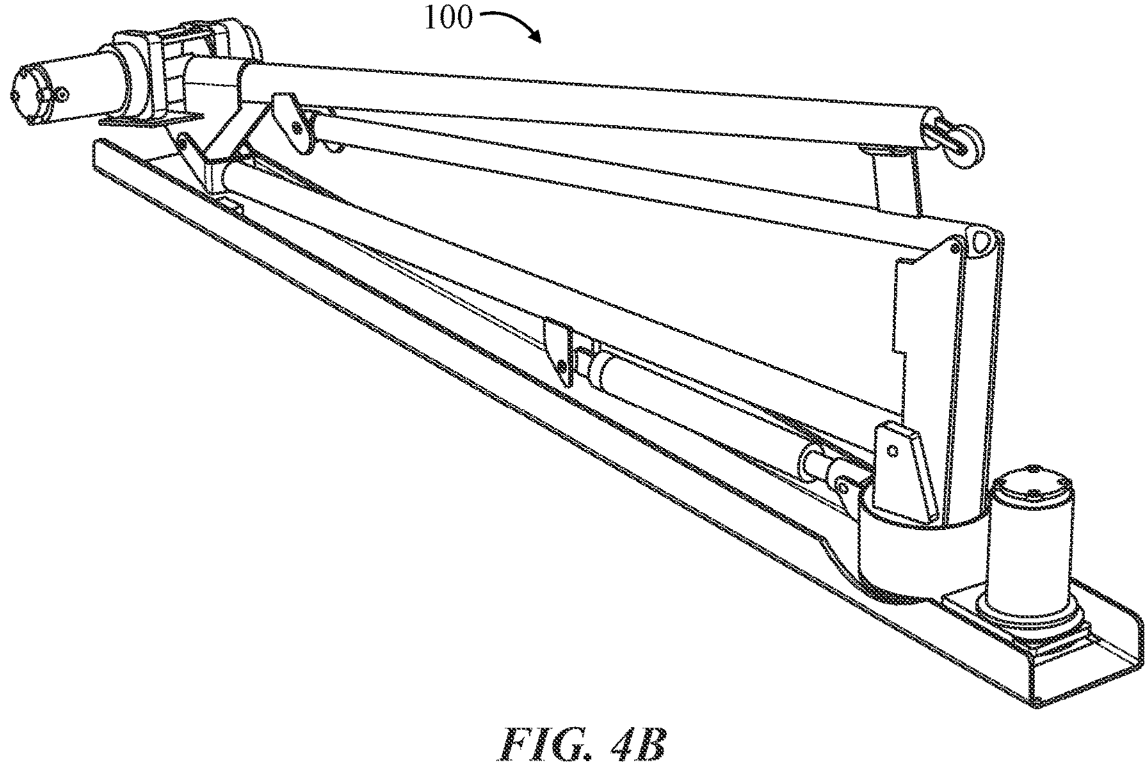
Figure 5A:
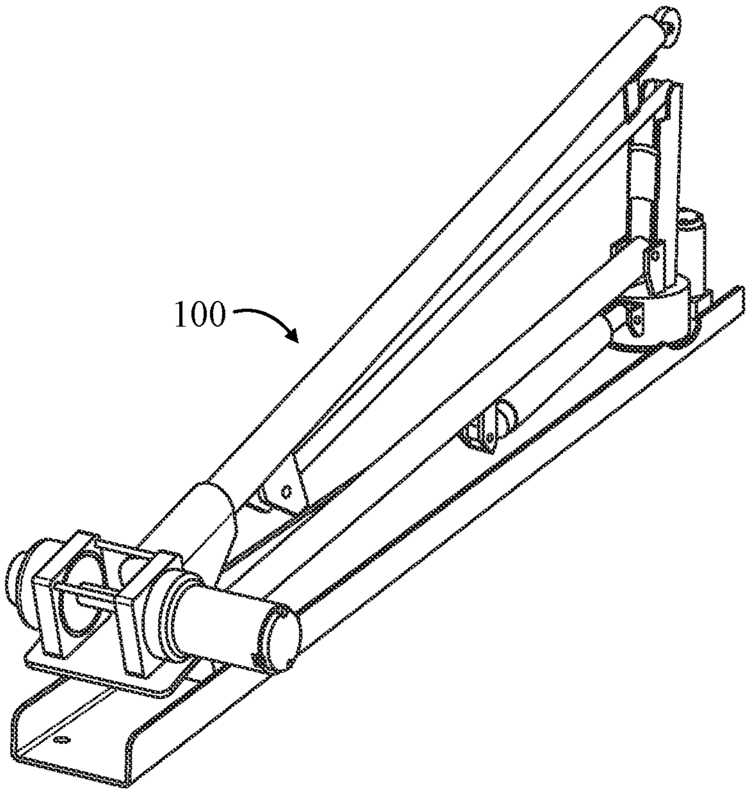
FIGS. 5A-5B illustrate a folding structural frame in folded configuration from a rear perspective, according to some embodiments.
Figure 5B:
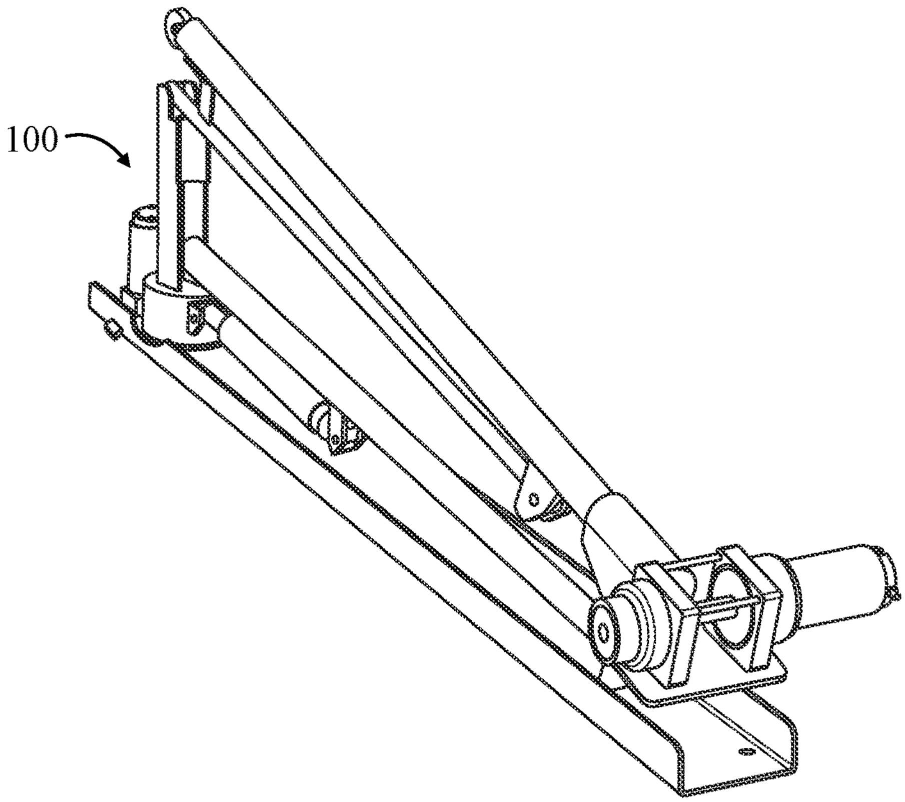
Figure 6A:
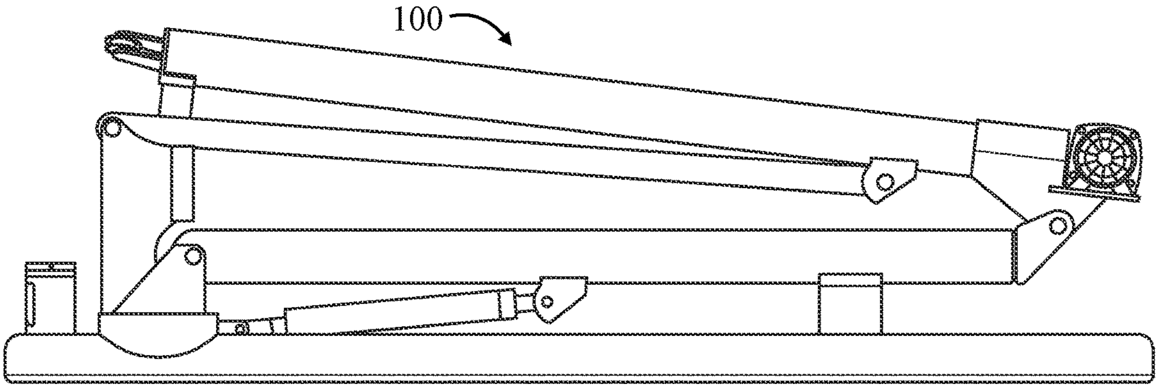
FIGS. 6A-6D illustrate a folding structural frame in various configurations from various perspectives, according to some embodiments.
Figure 6B:
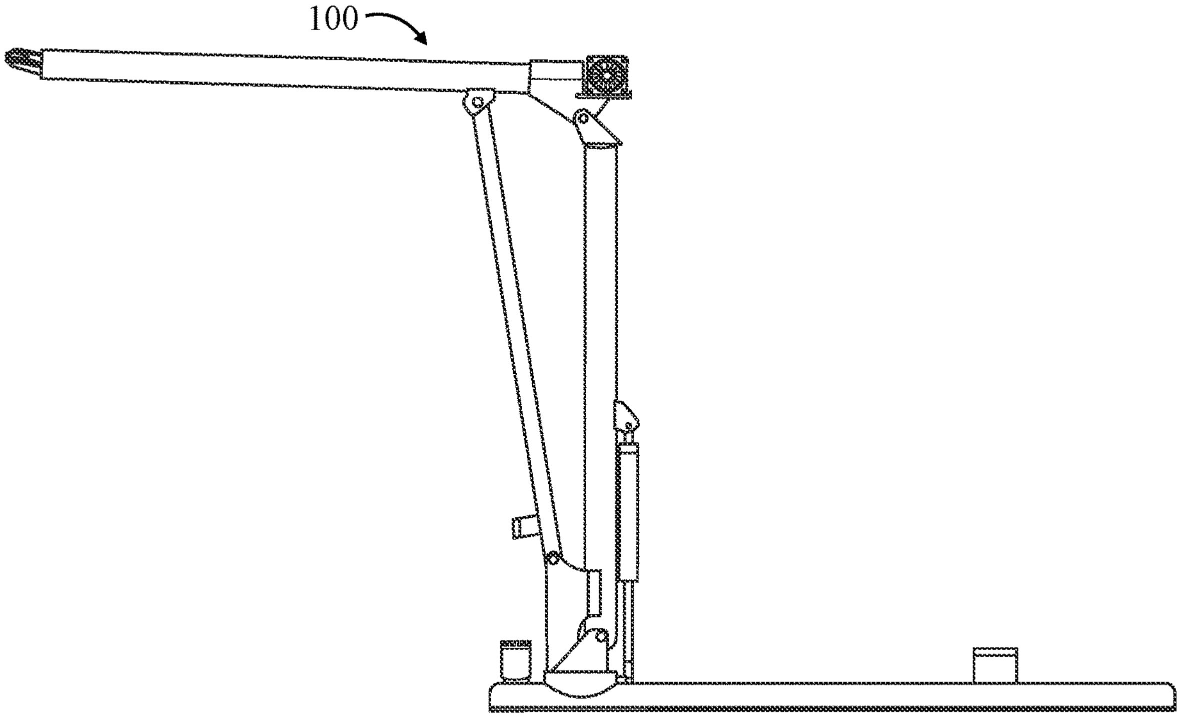
Figure 6C:
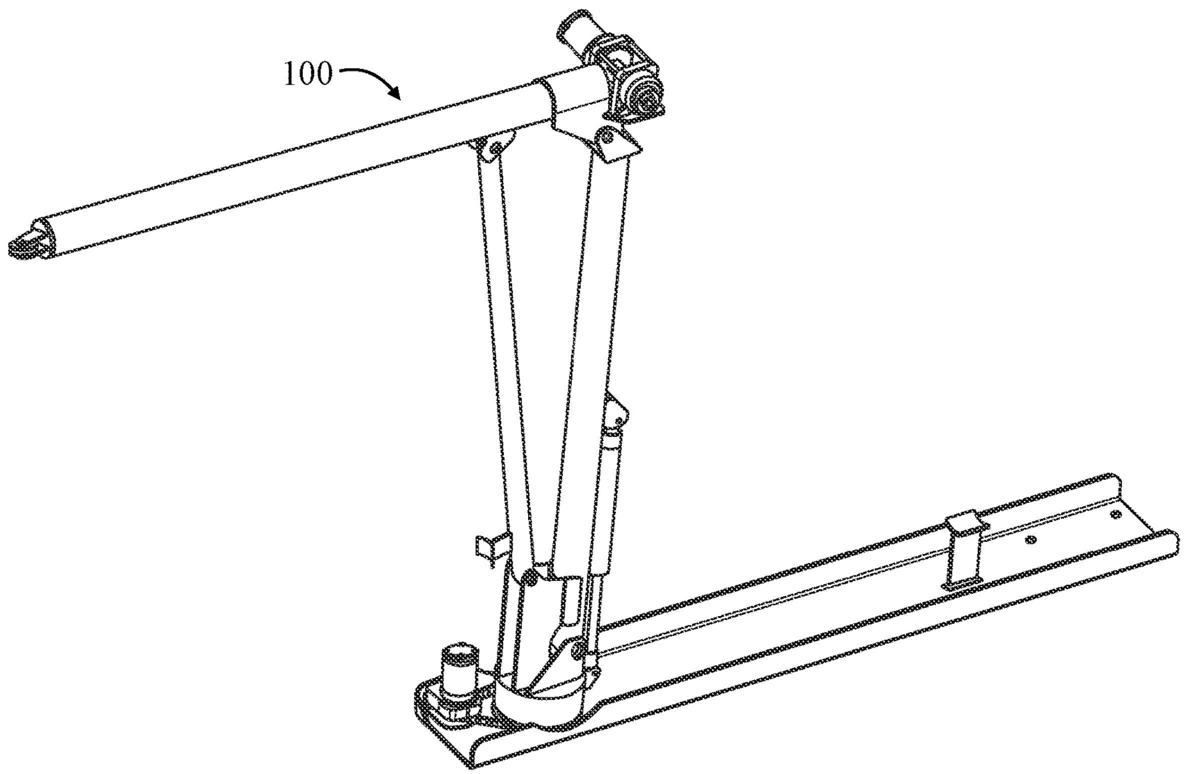
Figure 6D:
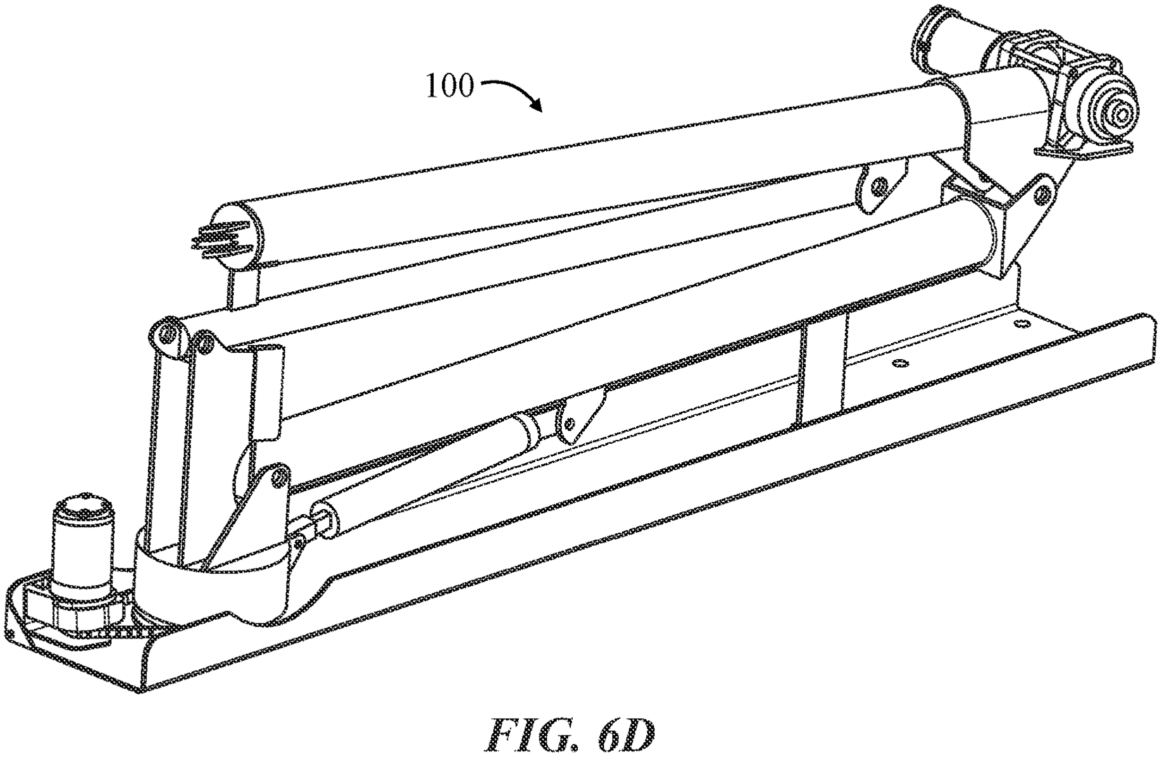

FIGS. 3A-3B illustrate a folding structural frame 100 in expanded configuration with from rear perspective views. The base 103 includes a channel 300 which allows the bottom end 107 of the first structural member 105 to engage therewith when in a folded configuration (illustrated and described below).

FIGS. 4A-4B, 5A-5B, and 6A-6D illustrate a folding structural frame 100 in folded configuration 400. wherein the folding structural frame 100 is capable of being manipulated between the operable configuration and a folded configuration 400. In the folded configuration, the first structural member 105 is substantially parallel to the base member 103 and the second structural member 109 is substantially parallel to the first structural member 105.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A folding structural frame comprising:

a base including a channel;

a first structural member coupled to the base at a bottom end and extending in a substantially vertical direction when in an operable configuration;

a second structural member coupled to a top end of the first structural member and extending in a substantially horizontal direction when in an operable configuration; and an elongated member extending through a hollow interior of the second structural member and guided over a pulley at a distal end and operable to be removably coupled with an item to be moved by the folding structural frame;

wherein the folding structural frame further comprises an electrically powered actuator comprising a ram lifter coupled at the base and operable to move the first structural member and the second structural member between the operable configuration and a folded configuration in a single, fluid motion, wherein, in the folded configuration, the first structural member is received at least partially within the channel of the base and is substantially parallel to the base, and the second structural member is substantially parallel to the first structural member.

2. The folding structural frame of claim 1, wherein the base includes a channel.

3. The folding structural frame of claim 2, wherein the channel at least partially receives the first structural member when in a folded configuration.

4. The folding structural frame of claim 3, wherein the folded configuration allows for storage of the folding structural frame.

5. The folding structural frame of claim 4, wherein the first structural member and the second structural member articulate via a hinge.

6. The folding structural frame of claim 1, wherein the item is removably coupled to the elongated member.

7. The folding structural frame of claim 1, wherein the first structural member is constructed of a rigid material.

8. The folding structural frame of claim 1, wherein the second structural member is constructed of a rigid material.

9. A folding structural frame, comprising:

a base including a channel;

a first structural member coupled to the base at a bottom end and extending in a substantially vertical direction when in an operable configuration;

a second structural member coupled to a top end of the first structural member and extending in a substantially horizontal direction when in an operable configuration; and an elongated member extending through a hollow interior of the second structural member and guided over a pulley at a distal end and operable to be removably coupled with an item to be moved by the folding structural frame, wherein the folding structural frame is capable of being manipulated between the operable configuration and a folded configuration wherein, in the folded configuration, the first structural member is at least partially received within the channel of the base and is substantially parallel to the base, and the second structural member is substantially parallel to the first structural member, wherein the folding structural frame further comprises an electrically powered actuator comprising a ram lifter coupled at the base and operable to move the first structural member and the second structural member between the operable configuration and the folded configuration in a single, fluid motion.

10. The folding structural frame of claim 9, further comprising a motor to permit the manipulation of the folding structural frame.

11. The folding structural frame of claim 9, wherein the base includes a channel.

12. The folding structural frame of claim 11, wherein the channel at least partially receives the first structural member when in a folded configuration.

13. The folding structural frame of claim 12, wherein the folded configuration allows for storage of the folding structural frame.

14. The folding structural frame of claim 13, wherein the first structural member and the second structural member articulate via a hinge.

15. The folding structural frame of claim 14, wherein the item is removably coupled to the elongated member.

* * * * *